3,428,627
17α-[3'-FURYL]-ESTRANE DERIVATIVES
Yvon Lefebvre, Pierrefonds, Quebec, Canada, assignor to American Home Products Corporation, New York, N.Y., a corporation of Delaware
No Drawing. Filed Dec. 16, 1966, Ser. No. 602,162
U.S. Cl. 260—239.55      15 Claims
Int. Cl. C07c 173/00; A61k 17/00

ABSTRACT OF THE DISCLOSURE

There are disclosed herein 17α-[3'-furyl]-17β-hydroxy-4-estren-3-one and 17α-[3'-furyl]-17β-hydroxy-5(10)-estren-3-one, their 17β-acyloxy derivatives in which the 17-acyloxy group contains from 2–4 carbon atoms, as well as their corresponding 3α- and 3β-hydroxy-derivatives and their respective 3-acylates in which the acyl group is an aliphatic, cycloaliphatic, aromatic, or aliphatic-aromatic group containing from 2–8 carbon atoms; those compounds possess progestational and cholesterol-lowering activities and formulations for their use are also given.

The intermediates 17α-[3'-furyl]-17β-hydroxy-3-methoxy-2,5(10)-estradiene and 17α-[3'-furyl]-17β-hydroxy-3-(1'-pyrrolidyl)-3,5-estradiene, both used in the preparation of the above compounds, are also disclosed.

The present invention relates to 17α-[3'-furyl]-estrane derivatives, to methods for preparing the same, and to intermediates used in their synthesis. The compounds of this invention may be represented by the following Formula I;

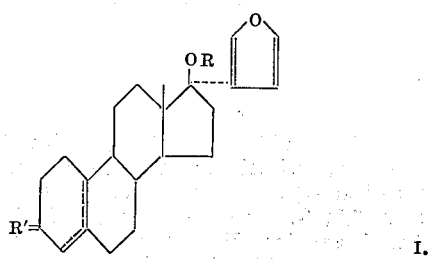

in which R represents hydrogen, or an aliphatic acyl group containing from 2–4 carbon atoms, R' represents ketonic oxygen; an hydroxyl group in the β-configuration and one atom of hydrogen; an aliphatic, cycloaliphatic, aromatic, or aliphatic-aromatic acyloxy group containing from 2–8 carbon atoms in the β-configuration and one atom of hydrogen; an hydroxyl group, or an acyloxy group as defined above in the α-configuration and one atom of hydrogen. The dotted line represents optional double bonds in positions 4,5, or 5(10).

The compounds of this invention are characterized by possessing progestational activity, and are useful as progestational agents. As such, they may be formulated in the form of tablets or capsules for oral administration, together with excipients such as starch, lactose, magnesium silicate, magnesium stearate, or they may be formulated in suspensions or solutions in pharmaceutically acceptable vehicles for peritoneal administration, preferably for subcutaneous injection. Such dosage forms may contain from 2–5 mg. of the active ingredient per unit dosage form to be administered. The compounds of this invention inhibit the biosynthesis of cholesterol to a remarkable degree and are useful as cholesterol-lowering agents. As such, they may be formulated in a similar manner as described above and may be administered in dosage forms containing from 0.5–5 mg. of the active ingredient.

More specifically, the compounds of this invention may be prepared by one of the three methods described in the following:

Method A

A lower alkyl ether of 17α-[3'furyl]-estradiol, preferably the 3-methyl ether (I), which is obtained when estradiol 3-methyl ether is treated with 3-furyllithium (prepared according to the procedure of S. Gronowitz and G. Sörlin, Arkiv. för. Kemi., vol. 19, p. 515 (1962)), as described in U.S. Patent No. 3,271,392, is reduced with lithium in liquid ammonia, under the conditions commonly known as the Birch reduction, to yield a 17α-[3'-furyl] - 17β-hydroxy-3(lower alkoxy)-2,5(10)-estradiene, preferably the 3-methoxy derivative (II). The latter compound is treated with a mineral acid, preferably with hydrochloric acid at room temperature, to yield 17α-[3'-furyl] - 17β-hydroxy-5(10)-estren-3-one (III). This last named compound may then be treated with alkali, preferably with aqueous sodium hydroxide, to obtain 17α-[3'-furyl]-17β-hydroxy-4-estren-3-one (IV), which may, in turn, be reduced with a complex metal hydride, preferably lithium tri(tert.-butoxy)aluminium hydride, to yield, predominantly 3β,17β - dihydroxy - 17α-[3'-furyl]-4-estrene (V), accompanied by minor amounts of the corresponding 3α-17β-dihydroxy derivative. Alternatively, 17α-[3'-furyl]-17β-hydroxy-5(10)-estren-3-one (III) may also be reduced with a complex metal hydride to yield predominantly the corresponding 3α,17β-dihydroxy-17α-[3'-furyl]-5(10)-estrene (VI).

The hydroxyl groups present in the above compounds may be acylated with aliphatic, cycloaliphatic, aromatic, or aliphatic-aromatic acyl halides or anhydrides in the presence of an acid acceptor, preferably pyridine, in the conventional manner. Under mild conditions of acylation the 3-mono-acylates are formed preferentially. By using more drastic conditions of acylation such as, for example, temperatures of up to 100° C. and duration of acylation of up to 24 hours, the hydroxyl group in position 17 is also acylated to yield the corresponding 3,17-diacylates.

The following formulae will illustrate the above sequence of reactions.

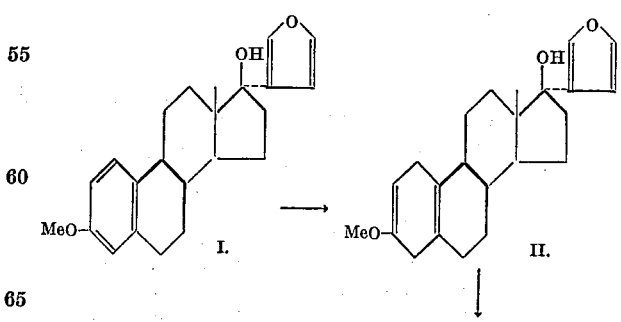

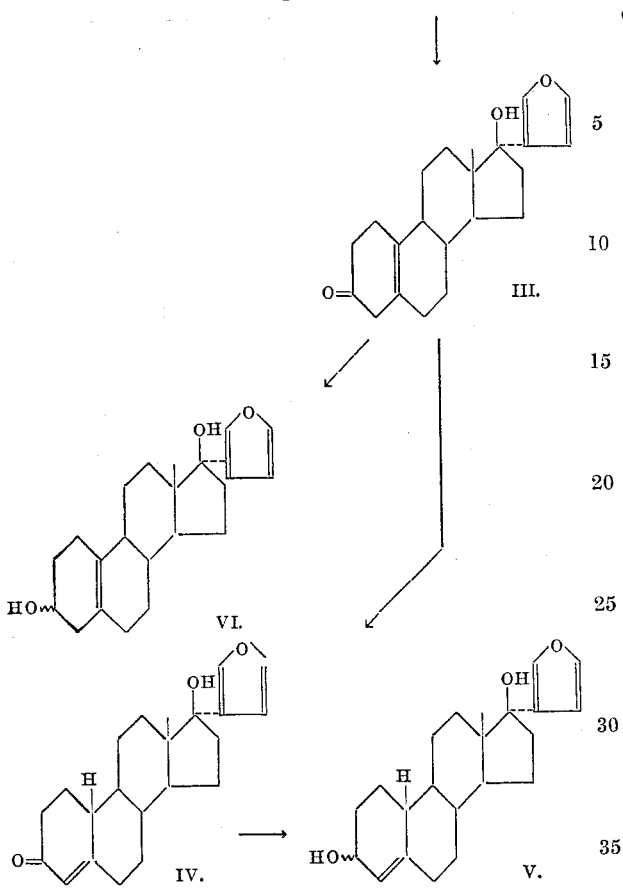

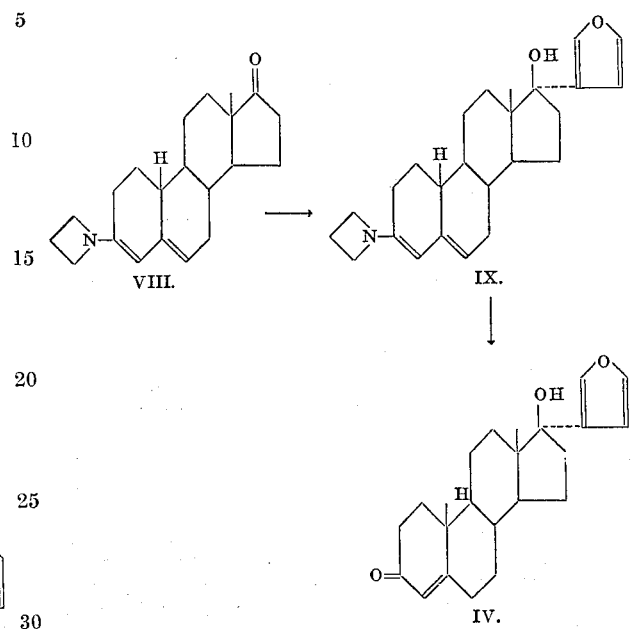

Method B

A 3-(lower alkoxy)-2,5(10)-estradien-17-one, preferably 3-methoxy-2,5(10)-estradien-17-one (VII), obtained as described by F. B. Colton et al., in J. Am. Chem. Soc., vol. 79, p. 1123 (1957), is treated with 3-furyllithium in the same manner as described above to yield a 3-(lower alkoxy) derivative of Formula II preferably, 17α-[3'-furyl]-17β-hydroxy-3-methoxy-2,5(10)-estradiene (II), from which the compounds of Formulae III, IV, V, or VI may be obtained as described above.

The following formulae will illustrate the above procedure.

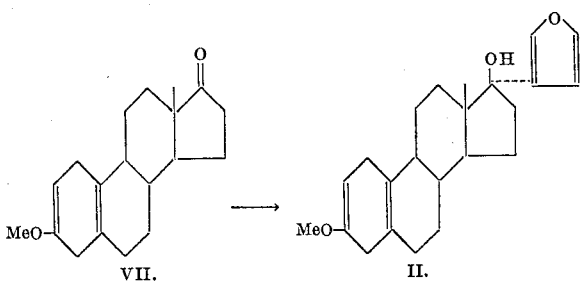

Method C

An enamine prepared from 4-estrene-3,17-dione, preferably 3-(1'-pyrrolidyl)-3,5-estradien-17-one (VIII), is treated with furyllithium in the manner described above to obtain the corresponding 17α-[3'-furyl]-17β-hydroxy-derivative, preferably 17α-[3'-furyl]-17β-hydroxy-3-(1'-pyrrolidyl)-3,5-estradiene (IX). The enamine group in the latter compound is then removed by treatment with a weak acid, preferably acetic acid to obtain 17β-[3'-furyl]-17β-hydroxy-4-estren-3-one (IV), which may in turn be converted to the corresponding 3,17β-dihydroxy derivatives (V) as described in Method A. The 3-acylates or the 3,17-diacylates of the above compounds may also be obtained in the same manner as described above.

The following formulae will illustrae this procedure.

The following examples, while not intended to limit the scope of this disclosure, will serve to illustrate this invention.

EXAMPLE 1

To liquid ammonia (250 ml.), is added a solution of 17α-[3'-furyl]-17β-hydroxy-3-methoxy - 1,3,5,(10)-estratriene (5 g.), in dry tetrahydrofuran (160 ml.), followed by the addition of small pieces of lithium (5.3 g.). The reaction is allowed to proceed at the boiling point of ammonia for 45 minutes. Dry ethanol (50 ml.) is added; the ammonia is allowed to evaporate. Water (300 ml.) is added and the mixture is extracted with ether. The ether solution is washed with water, dried and evaporated, yielding 17α - [3'-furyl]-17β-hydroxy-3-methoxy-2,5(10)-estradiene, purified by crystallization from methanol containing a little pyridine, M.P. 168–172° C.

EXAMPLE 2

A solution of iodofuran (15 g.), ether (325 ml.), and a 1.18 N etheral solution of n-butyllithium (56.6 ml.), is stirred at —60° C. for 30 minutes. A solution of 3-methoxy-2,5(10)-estradien-17-one (F. B. Colton et al., J. Am. Chem. Soc., 79, 1123 (1957)), (15 g.), in toluene (600 ml.) is added. The mixture is stirred at room temperature for 16 hours under an atmosphere of nitrogen. Water and ether are added. The organic solvents are washed with water, dried and evaporated to yield 17α-[3'-furyl]-17β-hydroxy-2,5(10) - estradiene, identical to the product obtained in Example 1.

EXAMPLE 3

A mixture of 17α - [3'-furyl]-17β-hydroxy-3-methoxy-2,5(10)-estradiene, obtained in Example 1 (1 g.), methanol (40 ml.), and a 0.1 N aqueous solution of hydrochloric acid (10 ml.), is stirred for 30 minutes at room temperature. The solid rapidly goes into solution. Water is added and the mixture is extracted with ether. The ether solution is washed with sodium bicarbonate and water. After drying and evaporating the solvents to dryness, the residue is purified by chromtography on alumina. The fractions eluted with mixtures of benzene-hexane and benzene are combined and crystalized from methanol, then from acetone-hexane to yield 17α - [3'-furyl]-17β-hydroxy-5(10)-estren-3-one, M.P. 185–191° C.

EXAMPLE 4

A mixture of 17α-[3'-furyl]-17β-hydroxy-5(10)-estren-3-one, obtained in Example 3 (4.75 g.), methanol (190 ml.), and a 5% aqueous sodium hydroxide solution (47.5 ml.) is stirred at room temperature for 60 minutes. The solution is diluted with water and the mixture is extracted with ether. The ether is washed with water and dried. After evaporating the solvents, the residue is chromatographed on alumina. The fractions eluted with mixtures of benzene and ethyl acetate are combined and crystallized with ethyl acetate to yield 17α-[3'-furyl]-17β-hydroxy-4-estren-3-one, M.P. 155–158° C.

EXAMPLE 5

Pyrrolidine (4 ml.), is added to a hot solution of 4-estrene-3,17-dione (10 g.) in methanol (40 ml.), After cooling the resulting precipitate is filtered and well washed with methanol to yield 3-(1'-pyrrolidyl)-3,5-estradien-17-one.

A solution of 3-iodofuran (6.74 g.), ether (135 ml.), and a 1.42 N ethereal solution of n-butyllithium is stirred for 30 minutes at −60° C. A solution of the enamine obtained above (6.74 g.) in toluene (270 ml.), is added and the reaction is allowed to proceed for 16 hours at room temperature. Water and ether are added. The organic phase is washed with water, dried and evaporated to dryness to yield 17α-[3'-furyl]-17β-hydroxy 1,3-(1'-pyrrolidyl)-3,5-estradiene.

The latter compound (9.1 g.) is dissolved in methanol (118 ml.). The solution is refluxed for 4 hours with acetic acid (18.2 ml.), water (27.3 ml.), and sodium acetate (27.3 ml.). Water is added and the mixture is extracted with ether. The ether is washed with dilute sulfuric acid, sodium bicarbonate and water. After drying and evaporating the solvents, the residue is chromatographed on alumina. The fractions eluated with mixtures of benzene and ethyl acetate are combined and crystallized from ethyl acetate to yield 17α - [3'-furyl]-17β-hydroxy-4-estren-3-one, M.P. 159–160° C.

EXAMPLE 6

A solution of 17α - [3'-furyl]-17β-hydroxy-4-estren-3-one, obtained in Examples 4 and 5 (6.1 g.), in dry tetrahydrofuran (92 ml.), is added dropwise to a solution of tritertiarybutoxy-aluminum hydride (15.25 g.), in tetrahydrofuran (92 ml.). The mixture is stirred for 4 hours at room temperature. A 20% aqueous solution of potassium hydroxide is added until a solid compound forms on the side of the flask (20 ml.). The solid is filtered. The filtrate is evaporated to dryness. The residue is dissolved in a mixture of chloroform-methanol. The organic phase is washed with dilute sulfuric acid, and water. After drying and evaporating the solvents, the residue is crystallized from methanol ether to yield 17α-[3'-furyl]-4-estrene-3β,17β-diol, M.P. 126–128° C.

By a similar procedure, the reduction of 17α-[3'-furyl]-17β-hydroxy-5(10)-estren-3-one with tri(tertiarybutoxy) aluminium hydride in tetrahydrofuran, yields predominantly 17α-[3'-furyl]-5(10)-estrene-3α,17β-diol.

EXAMPLE 7

A solution of 17α-[3'-furyl] - 4 - estrene - 3β,17β-diol, obtained in Example 6 (1.6 g.), pyridine (16 ml.), and acetic anhydride (16 ml.), is left overnight at room temperature. The solution is poured in ice-water and the mixture is extracted with ether. The ether solution is washed with dilute sulfuric acid, sodium bicarbonate and water. After drying and evaporating the solvent, the residue is chromatographed on alumina. The fractions eluted with benzene-hexane are combined and crystallized from acetone-hexane to give 3β-acetoxy-17α-[3'-furyl]-4-estren-17β-ol, M.P. 108–114° C.

Similarly, esterification of 17α-[3'-furyl]-4-estrene-3β, 17β-diol, but using instead of acetic anhydride other acylating agent such as propionic anhydride, butyric anhydride, hexanoic anhydride, benzoyl chloride, or cyclopentyl propionyl chloride in pyridine solutions at room temperature overnight yields the corresponding 3-acylates such as, 17α-[3'-furyl] - 3β - propionyloxy-4-estren-17β-ol, 3β-butanoyloxy-17α-[3' - furyl] - 4-estren-17β-ol, 17α-[3'-furyl]-3β-hexanoyloxy-4-estren-17β-ol, 3β-benzoyloxy 17α-[3'-furyl]-estren-17β-ol, or 3β-cyclopentylpropionyloxy-17α-[3'-furyl]-4-estren-17β-ol.

EXAMPLE 8

By a procedure similar to the one described in Example 7, acylation of 17α-[3'-furyl]-5(10)-estrene-3α, 17β-diol, with acetic anhydride, propionic anhydride, butyric anhydride, hexanoic anhydride, benzoyl chloride, or cyclopentylpropionyl-chloride in pyridine solution at room temperature overnight yields 3α-acetoxy-17α-[3'-furyl]-5(10)-estren-17β-ol,
17α-[3'-furyl]-3α-propionyloxy-5(10)-estren-17β-ol,
3α-butanoyloxy-17α-[3'-furyl]-5(10)-estren-17β-ol,
17α-[3'-furyl]-3α-hexanoyloxy-5(10)-estren-17β-ol,
3α-benzoyloxy-17α-[3'-furyl]-5(10)-estren-17β-ol, or
3α-cyclopentylpropionyloxy-17α-[3'-furyl]-5(10)-estren-17-β-ol.

EXAMPLE 9

A solution of 17α-[3'-furyl] - 4 - estrene - 3β,17β-diol, obtained in Example 6 (1.6 g.), pyridine (16 ml.), and acetic anhydride (56 ml.), is heated on the steam bath for 24 hours. The reaction is worked up as described in Example 7. The residue is chromatographed on alumina and the fractions eluted with mixtures of benzene and hexane are combined and crystallized from methanol-water, then with ether petroleum-ether to yield 3β,17β-diacetoxy-17α-[3'-furyl]-4-estrene M.P. 144–146° C.

Similarly acylation of 17α-[3'-furyl]-4-estrene-3β,17β-diol, using propionic and butyric anhydrides instead of acetic anhydride in pyridine solutions at 100° C. for 24 hours, yields the corresponding 3β,17β-diacylates such as, 3β,17β - dipropionyloxy - 17α-[3'-furyl]-4-estrene and 3β, 17β-dibutanoyloxy-17α-[3'-furyl]-4-estrene.

By a similar procedure acylation of 17α-[3'-furyl]-5(10)-estrene-3α,17β-diol with acetic, propionic and butyric anhydrides in pyridine solutions at 100° C. for 24 hours yields 3α,17β-diacetoxy - 17α-[3'-furyl] - 5(10)-estrene, 3α,17β-dipropionyloxy - 17α - [3'-furyl] - 5(10)-estrene and 3α,17β-dibutanoyloxy - 17α-[3'-furyl]-5(10)-estrene, respectively.

By a similar procedure, acylation of 17α-[3'-furyl]-5,(10)-17β-hydroxy-estren-3-one and 17α-[3'-furyl]-17β-hydroxy-4-estren-3-one with acetic, propionic, and butyric anhydrides in pyridine solutions at 100° C. for 24 hours yields 17β-acetoxy-17α-[3'-furyl]-5(10)-estren-3-one,
17α-[3'-furyl]-17β-propionyloxy-5(10)-estren-3-one,
17β-butanoyloxy-17α-[3'-furyl]-5(10)-estren-3-one,
17β-acetoxy-17α-[3'-furyl]-4-estren-3-one,
17α-[3'-furyl]-17β-propionyloxy-4-estren-3-one, and
17β-butanoyloxy-17α-[3'-furyl]-4-estren-3-one,
respectively.

I claim:
1. A compound of the formula

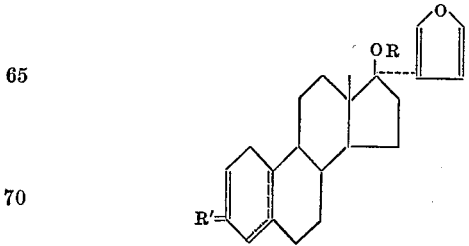

wherein R is selected from hydrogen and lower aliphatic acyl groups; and R' is selected from (1) ketonic oxygen; (2) an hydroxyl group in the β-configuration and one atom of hydrogen; (3) a group selected fro aliphatic, cycloaliphatic, aromatic and aliphatic-aromatic acyloxy groups containing from two to eight carbon atoms in the β-configuration and one atom of hydrogen; (4) an hydroxyl group in the α-configuration and one atom of hydrogen; and (5) a lower aliphatic acyloxy group in the α-configuration and one atom of hydrogen.

2. A compound of the formula

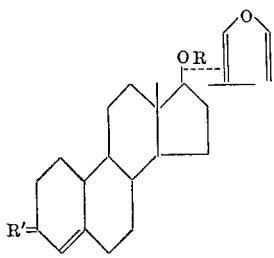

wherein R is selected from hydrogen and lower aliphatic acyl groups; and R' is selected from (1) ketonic oxygen; (2) an hydroxyl group in the β-configuration and one atom of hydrogen; (3) a group selected from aliphatic, cycloaliphatic, aromatic and aliphatic-aromatic acyloxy groups containing from two to eight carbon atoms in the β-configuration and one atom of hydrogen; (4) an hydroxyl group in the α-configuration and one atom of hydrogen; and (5) a lower aliphatic acyloxy group in the α-configuration and one atom of hydrogen.

3. A compound of the formula

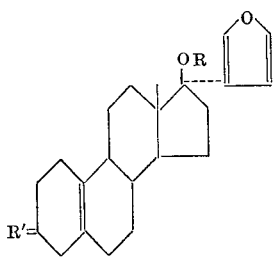

wherein R is selected from hydrogen and lower aliphatic acyl groups; and R' is selected from (1) ketonic oxygen; (2) an hydroxyl group in the β-configuration and one atom of hydrogen; (3) a group selected from aliphatic, cycloaliphatic, aromatic and aliphatic-aromatic acyloxy groups containing from two to eight carbon atoms in the β-configuration and one atom of hydrogen; (4) an hydroxyl group in the α-configuration and one atom of hydrogen; and (5) a lower aliphatic acyloxy group in the α-configuration and one atom of hydrogen.

4. 17α-[3'-furyl]-17β-hydroxy-5(10)-estren-3-one, as claimed in claim 1.

5. 17β-acetoxy-17α-[3'-furyl]-5(10)-estren-3-one, as claimed in claim 1.

6. 17α-[3'-furyl]-17β-hydroxy - 4 - estren - 3 - one, as claimed in claim 1.

7. 17β-acetoxy-17α-[3'-furyl] - 4 - estren - 3 - one, as claimed in claim 1.

8. 17α-[3'-furyl]-5(10)-estrene-3α,17β-diol, as claimed in claim 1.

9. 17α-[3'-furyl]-4-estrene-3β,17β-diol, as claimed in claim 1.

10. 3α-acetoxy-17α-[3'-furyl]-5(10) - estren - 17β - ol, as claimed in claim 1.

11. 3β-acetoxy-17α-[3'-furyl]-4 - estren - 17β - ol, as claimed in claim 1.

12. 3α,17β-diacetoxy-17α-[3'-furyl]-5(10) - estrene, as claimed in claim 1.

13. 3β-17β-diacetoxy-17α-[3' - furyl] - 4 - estrene, as claimed in claim 1.

14. 17α-[3'-furyl]-17β-hydroxy-3 - methoxy - 2,5(10)-estradiene.

15. 17α-[3'-furyl]-17β-hydroxy - 3(1' - pyrrolidyl)-3,5-estradiene.

References Cited
UNITED STATES PATENTS
3,271,392  9/1966  Lefebvre.

LEWIS GOTTS, Primary Examiner.

ETHEL G. LOVE, Assistant Examiner.

U.S. Cl. X.R.

260—239.5; 424—241

UNITED STATES PATENT OFFICE
CERTIFICATE OF CORRECTION

Patent No. 3,428,627                                           February 18, 1969

Yvon Lefebvre

It is certified that error appears in the above identified patent and that said Letters Patent are hereby corrected as shown below:

Column 4, formulas VIII and IX, the lower left-hand portion of the formulas each occurrence, should appear as shown below:

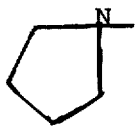

Column 6, lines 62 to 72, the lower left-hand portion of the formula should appear as shown below:

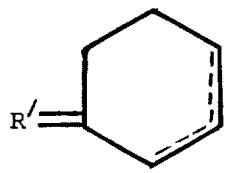

Column 7, lines 8 to 19, the upper right-hand portion of the formula should appear as shown below:

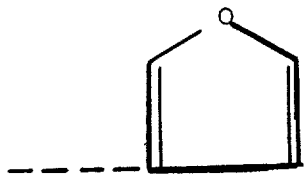

Signed and sealed this 31st day of March 1970.

(SEAL)
Attest:

EDWARD M. FLETCHER, JR.                                    WILLIAM E. SCHUYLER, JR.
Attesting Officer                                                   Commissioner of Patents